(12) United States Patent
Lee

(10) Patent No.: US 9,008,912 B2
(45) Date of Patent: Apr. 14, 2015

(54) REAR CAMERA SYSTEM FOR VEHICLE HAVING PARKING GUIDE FUNCTION AND PARKING GUIDE SYSTEM USING THE SAME

(71) Applicant: Hyundai Mobis Co., Ltd., Yongin-si (KR)

(72) Inventor: Hak Kyu Lee, Incheon (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 0 days.

(21) Appl. No.: 13/903,268

(22) Filed: May 28, 2013

(65) Prior Publication Data

US 2014/0039760 A1 Feb. 6, 2014

(30) Foreign Application Priority Data

Aug. 6, 2012 (KR) .................. 10-2012-0085841

(51) Int. Cl.
*G06F 17/00* (2006.01)
*B60W 30/06* (2006.01)
*B60K 35/00* (2006.01)
*B62D 15/02* (2006.01)

(52) U.S. Cl.
CPC ............. *B60W 30/06* (2013.01); *B60K 35/00* (2013.01); *B62D 15/0295* (2013.01); *B60K 2350/1088* (2013.01)

(58) Field of Classification Search
CPC .. G06T 11/00; B60R 1/002; B60R 2300/105; B60R 2300/607; B60R 2300/00
USPC ............ 701/36, 41; 348/118, 148; 340/932.2
See application file for complete search history.

(56) References Cited

U.S. PATENT DOCUMENTS

| 7,012,549 B2* | 3/2006 | Mizusawa et al. ......... 340/932.2 |
| 2002/0175832 A1* | 11/2002 | Mizusawa et al. ......... 340/932.2 |
| 2011/0298926 A1* | 12/2011 | Katsunaga et al. ........... 348/148 |
| 2012/0320213 A1* | 12/2012 | Ikeda et al. ................... 348/148 |
| 2013/0002877 A1* | 1/2013 | Miyoshi et al. ............... 348/148 |
| 2014/0095021 A1* | 4/2014 | Tate et al. ....................... 701/36 |

FOREIGN PATENT DOCUMENTS

| JP | 2009-292339 | 12/2009 |
| KR | 10-0882688 | 2/2009 |
| KR | 10-1010186 | 2/2011 |
| KR | 10-2011-0136218 | 12/2011 |
| WO | WO 2011/014482 | 2/2011 |

* cited by examiner

*Primary Examiner* — McDieunel Marc
(74) *Attorney, Agent, or Firm* — NSIP Law

(57) ABSTRACT

Provided are a rear camera system for vehicles and a parking guide system using the same, which displays the minimum width and maximum width of a parking area guideline in consideration of the dimensions of a vehicle in displaying a parking area, and displays a stop position in backing. The parking guide system includes a camera mounted on a vehicle, a display unit disposed inside the vehicle, and a parking guide control unit connected to the camera and the display unit. The parking guide control unit includes a parking logic operation unit receiving a steering angle, a speed, or a parking mode from the vehicle, a parking area guideline display unit displaying a guideline for parking guide on the basis of the result of the logic operation, and an image synthesizer synthesizing the results, displayed by the parking area guideline display unit, and an image obtained by the camera.

14 Claims, 9 Drawing Sheets

REAR CAMERA SYSTEM FOR VEHICLE HAVING PARKING GUIDE FUNCTION AND PARKING GUIDE SYSTEM USING THE SAME

CROSS-REFERENCE TO RELATED APPLICATIONS

This application claims priority under 35 U.S.C. §119 to Korean Patent Application No. 10-2012-0085841, filed on Aug. 6, 2012, the disclosure of which is incorporated herein by reference in its entirety.

TECHNICAL FIELD

The present disclosure relates to a rear camera system for vehicles with a parking guide function and a parking guide system using the same, and in particular, to a rear camera system for vehicles with a parking guide function and a parking guide system using the same, which display a parking area and a guideline and thus enable a user to conveniently park a vehicle.

BACKGROUND

With advanced electric and electronic technologies applied to vehicles, various systems for assisting a driver are applied to vehicles. Particularly, a parking guide system, which assists parking by guiding a target parking position or displaying a target trace or an expected trace, is variously developed for guiding parking that causes inconvenience and difficulty to many drivers.

A related art parking guide system is disclosed in WO2011/014482A1.

The related art parking guide system, disclosed in WO2011/014482A1, guides a target parking position and the length and width of a vehicle, displays a target trace necessary for moving to the target parking position, displays an expected trace based on the turn of a handle, guides a matched point between the target trace and the expected trace, and guides the remaining distance in backing, thereby assisting parking.

SUMMARY

Accordingly, the present disclosure provides a rear camera system for vehicles with a parking guide function and a parking guide system using the same, which display a parking area and a guideline and thus enable a user to conveniently park a vehicle.

In one general aspect, a parking guide system for vehicles includes: a camera mounted on a rear of a vehicle; a display unit disposed inside the vehicle; and a parking guide control unit connected to the camera and the display unit, wherein the parking guide control unit includes: a parking logic operation unit receiving a steering angle, a speed, or a parking mode from the vehicle to perform a parking logic operation; a parking area guideline display unit displaying a parking area guideline for parking guide on the basis of the result of the logic operation of the parking logic operation unit; and an image synthesizer synthesizing the results, displayed by the parking logic operation unit and the parking area guideline display unit, and an image obtained by the camera, and the display unit displays the image synthesized by the image synthesizer.

The parking guide control unit may be included in the camera, and the display unit may be a display unit of an Audio Video Navigation (hereinafter, "AVN ") system mounted on the vehicle.

The parking area guideline may include a minimum width and maximum width of a parking-enabled area that are calculated on the basis of dimensions of the vehicle and ambient landform information, and the parking area guideline display unit may further include stop line information that is calculated on the basis of the parking area guideline.

The parking guide control unit may further include an image amplifier amplifying the synthesized image, and the display unit may display the image amplified the image amplifier.

The display unit may further display steering angle mark information in which an expected position of the vehicle based on steering of a handle is displayed as one line with respect to an outer bumper surface in a parking area.

In another general aspect, a rear camera system for vehicles with a parking guide function includes: a capturer capturing a rearward image of a vehicle; a parking logic operation unit receiving a steering angle, a speed, or a parking mode from the vehicle to perform a parking logic operation; a parking area guideline display unit displaying a parking area guideline for parking guide on the basis of the result of the logic operation of the parking logic operation unit; and an image synthesizer synthesizing the results, displayed by the parking logic operation unit and the parking area guideline display unit, and the image captured by the capturer.

The image synthesized by the image synthesizer may be transferred to a display unit of an AVN system mounted on the vehicle, and displayed for a driver.

The rear camera system may further include an image amplifier amplifying the synthesized image, and the image amplified by the image amplifier may be transferred to a display unit of an AVN system mounted on the vehicle, and displayed for a driver.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a rear camera system for vehicles with a parking guide function and a parking guide system using the same according to an embodiment of the present invention will be described in detail with reference to the accompanying drawings.

Figure 1:
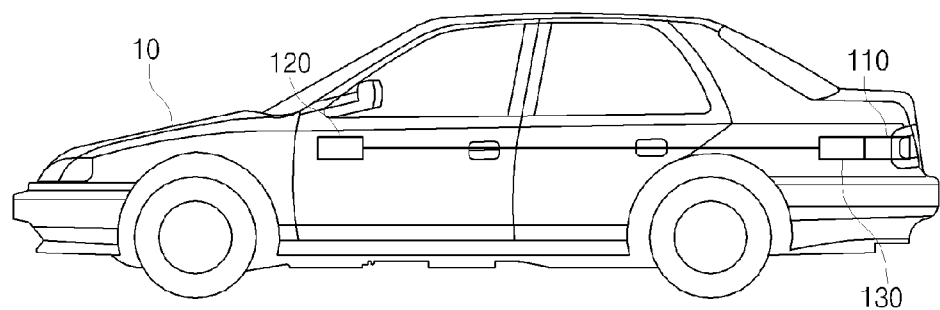
FIG. 1 is a diagram illustrating a vehicle including a parking guide system according to an embodiment of the present invention.

FIG. 1 is a diagram schematically illustrating a parking guide system for vehicles according to an embodiment of the present invention.

As illustrated in FIG. 1, the parking guide system for vehicles according to an embodiment of the present invention includes a camera 110 and a parking guide control unit 130 that are mounted on the rear of a vehicle 10, and a display unit 120 disposed inside the vehicle 10.

In FIG. 1, the camera 110 and the parking guide control unit 130 are functionally divided and illustrated as different blocks, but, in actual implementation, the parking guide control unit 130 may be included in the camera 110.

The display unit 120 may be disposed as a separate display (which is used in the parking guide system) inside the vehicle 10, but the parking guide system may share the display unit 20 with an audio video navigation (AVN) for vehicles.

Figure 2:
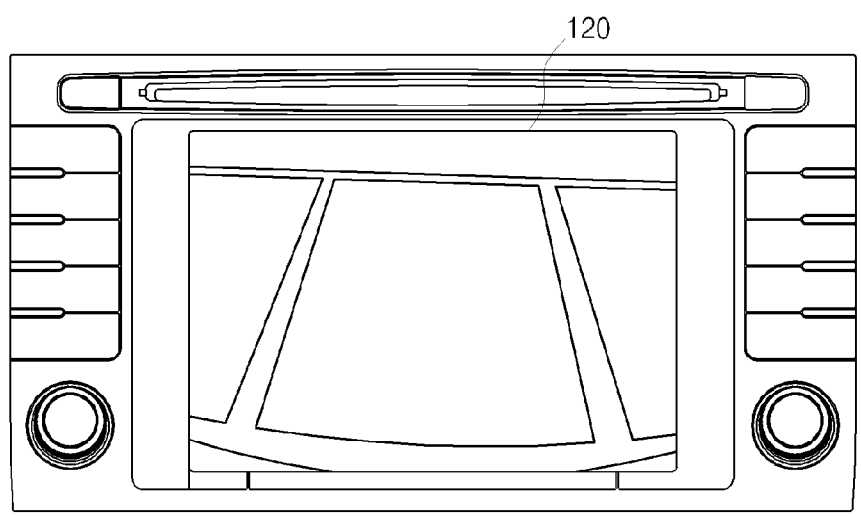
FIG. 2 is a diagram illustrating a display unit of the parking guide system according to an embodiment of the present invention.

FIG. 2 is a diagram illustrating the display unit 120 of the parking guide system according to an embodiment of the present invention. In an embodiment of FIG. 2, the display unit of the AVN system is used as that of the parking guide system.

Figure 3:
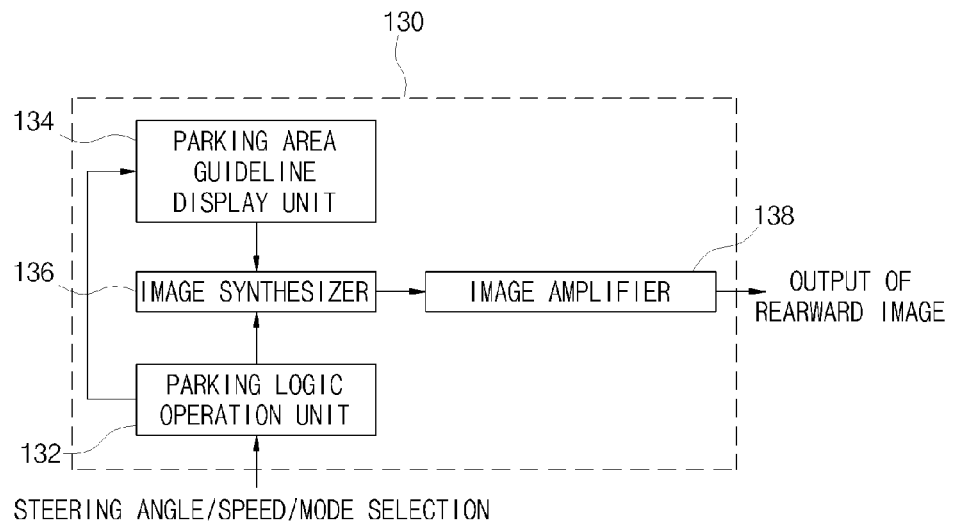
FIG. 3 is a diagram illustrating a parking guide control unit of the parking guide system according to an embodiment of the present invention.

FIG. 3 is a diagram illustrating in more detail a configuration of the parking guide control unit 130 of the parking guide system according to an embodiment of the present invention.

As illustrated in FIG. 3, the parking guide control unit 130 includes: a parking logic operation unit 132 that receives the selection of a steering angle/speed/mode to perform a parking logic operation; a parking area guideline display unit 134 that displays a parking area guideline for parking guide on the basis of the result of the logic operation of the parking logic operation unit 132; an image synthesizer 136 that synthesizes the results, displayed by the parking logic operation unit 132 and the parking area guideline display unit 134, and an image obtained by the camera 110; and an image amplifier 138 that amplifies the synthesized image.

In the parking guide system according to an embodiment of the present invention, the parking area guideline display unit 134 calculates the minimum width and maximum width of a parking area guideline on the basis of the result of the logic operation of the parking logic operation unit 132, and displays the minimum width and maximum width of the parking area guideline for a user.

Figure 4:
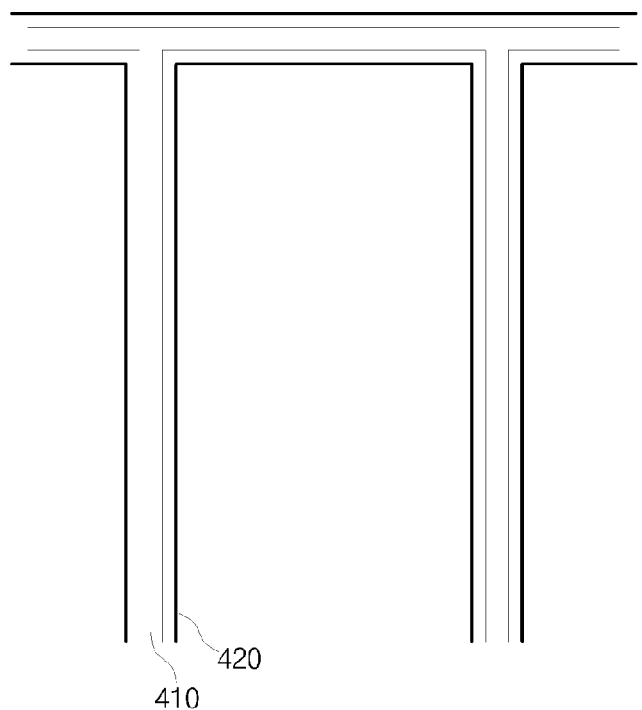
FIG. 4 is a diagram illustrating a method of displaying a parking area in the parking guide system according to an embodiment of the present invention.

FIG. 4 is a diagram illustrating a method of displaying a parking area in the parking guide system according to an embodiment of the present invention.

As illustrated in FIG. 4, by adding the minimum width and maximum width of the parking area guideline onto a previously-displayed parking area 410, the parking area guideline display unit 134 doubly displays the minimum width and maximum width of the parking area guideline (see 410 of FIG. 4), and thus can more accurately and safely provide parking guide even in an area having an unusual landform.

Moreover, as described above, the present invention enables the guide of a stop assist line with the calculated minimum width and maximum width of the parking area guideline. Generally, a line indicating a parking area is displayed to have a width of 10 cm, and thus, an accurate margin is secured, thereby guiding the stop assist line. That is, in addition to the display of a distance guide mark line, by guiding the stop assist line, a driver can immediately determine a stop position even without a stop guide mark or phrase, and thus, visibility is enhanced.

The guide of the stop line will be described in more detail below.

Figure 5:
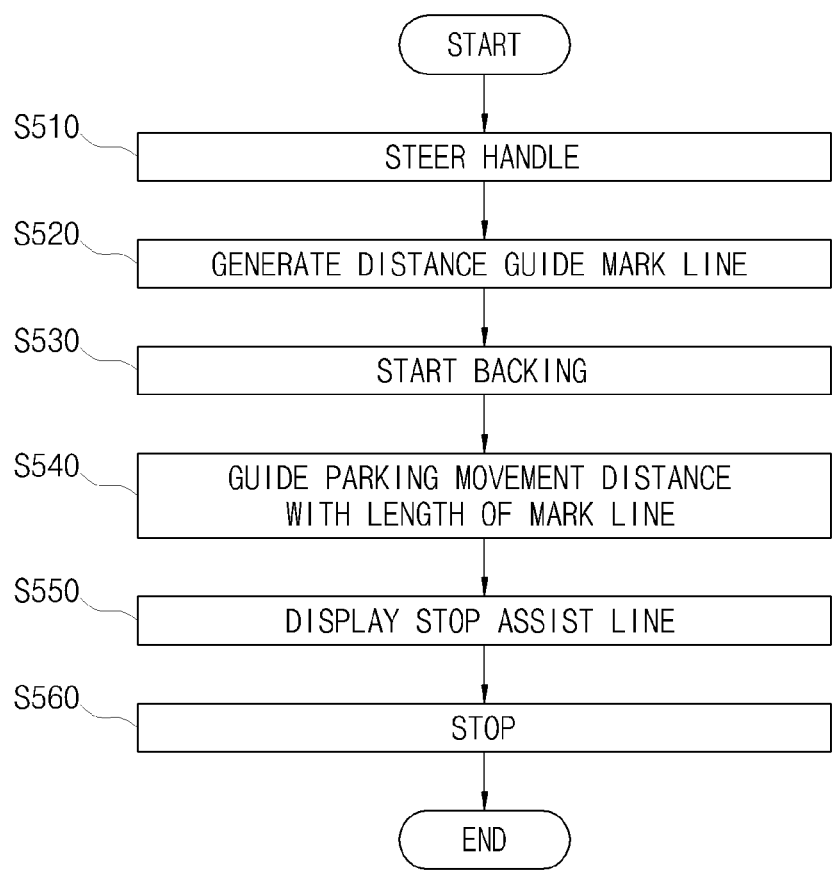
FIG. 5 is a flowchart illustrating an operation of parking a vehicle depending on the parking guide of the parking guide system according to an embodiment of the present invention.

FIG. 5 is a flowchart illustrating an operation of parking a vehicle depending on the parking guide of the parking guide system according to an embodiment of the present invention.

As illustrated in FIG. 5, a parking mode is performed, and when the steering of a handle is started in operation S510, a rearward screen of a vehicle is displayed on the display unit, and a distance guide mark line is generated in operation S520.

When the backing of the vehicle is started in operation S530, a parking movement distance is guided with the length of the distance guide mark line in operation S540.

Both the distance guide mark line and a stop assist line requiring the stop of the vehicle are displayed on a screen in operation S550, and the vehicle stops according to the guide of the stop assist line in operation S560.

FIGS. 6A to 6E and FIGS. 7A to 7E are diagrams illustrating an operation of parking a vehicle with the help of the parking guide system according to an embodiment of the present invention. FIGS. 6A to 6E are diagrams illustrating an operation of performing perpendicular parking, and FIGS. 7A to 7E are diagrams illustrating an operation of performing parallel parking.

First, an operation of performing perpendicular parking will now be described with reference to FIGS. 6A to 6E.

Figure 6A:
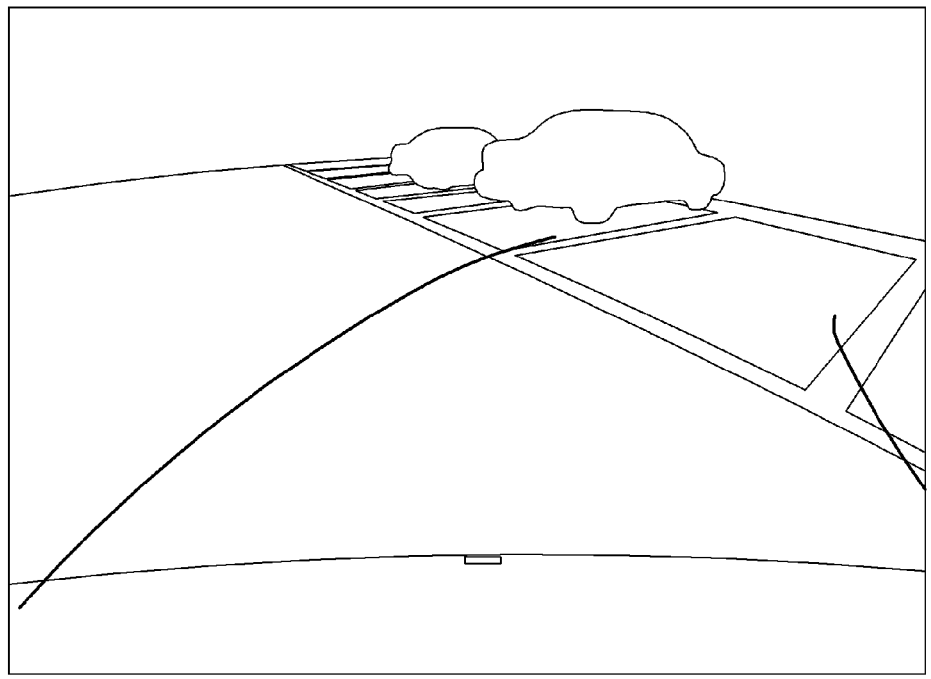
FIGS. 6A to 6E are diagrams illustrating an operation of performing perpendicular parking with the help of the parking guide system according to an embodiment of the present invention.
Figure 6B:
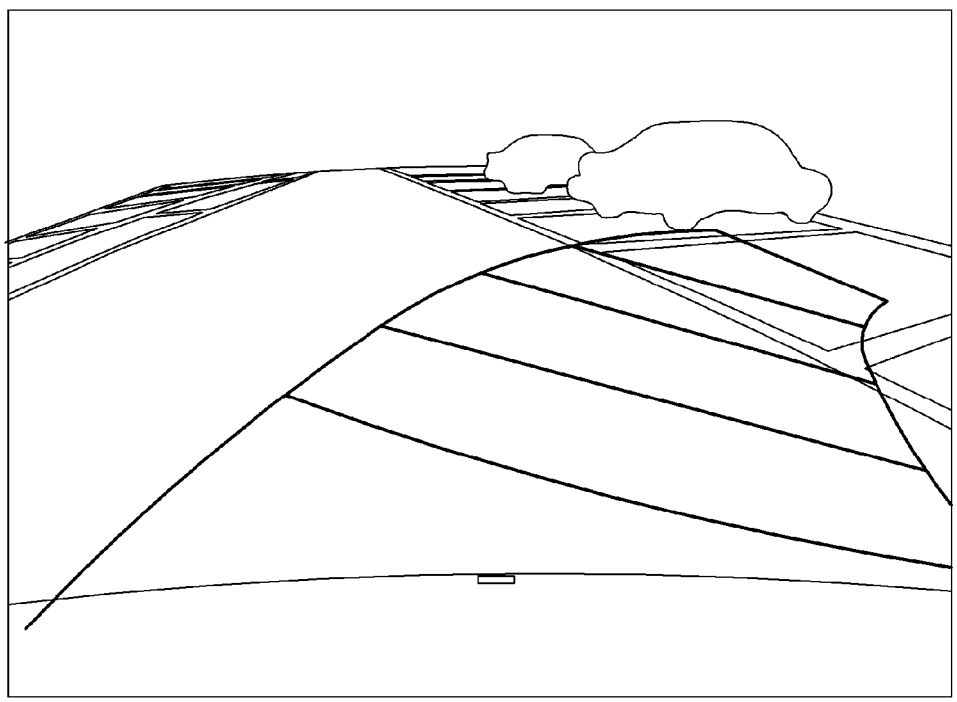
Figure 6C:
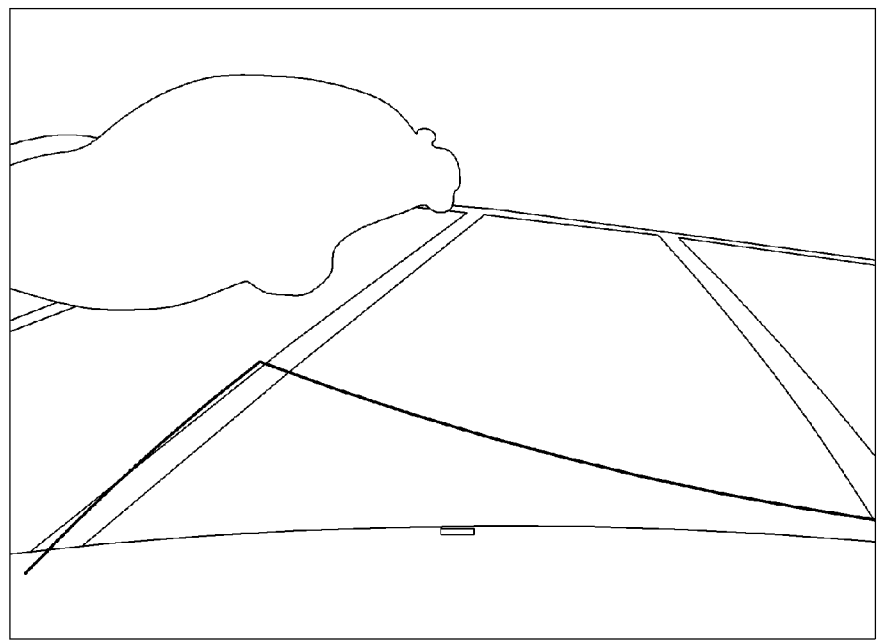

As illustrated in FIG. 6A, the parking mode is performed, and when the steering of the handle is started in operation S510, the rearward screen of the vehicle is displayed on the display unit, and as illustrated in FIG. 6B, the distance guide mark line is generated in operation S520, and the backing of the vehicle is started in operation S530. Subsequently, as illustrated in FIG. 6C, the parking movement distance is guided with the length of the distance guide mark line in operation S540.

Figure 6D:
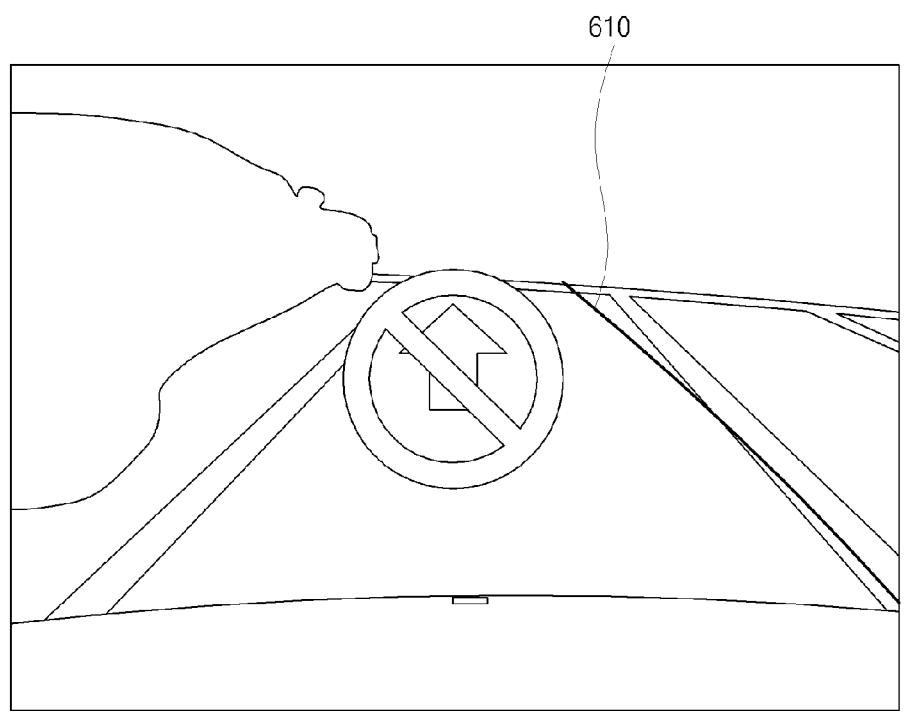

As illustrated in FIG. 6D, both the distance guide mark line and a stop assist line 610 requiring the stop of the vehicle are displayed on a screen in operation S550. Also, a mark for guiding the stop of a vehicle is displayed on a screen depending on the case. However, in the parking guide system according to an embodiment of the present invention, the stop assist line 610 is displayed, and thus, a driver can determine a stop position. Accordingly, even when there is no separate stop guide mark, a driver can easily stop a vehicle at a stop position.

Figure 6E:
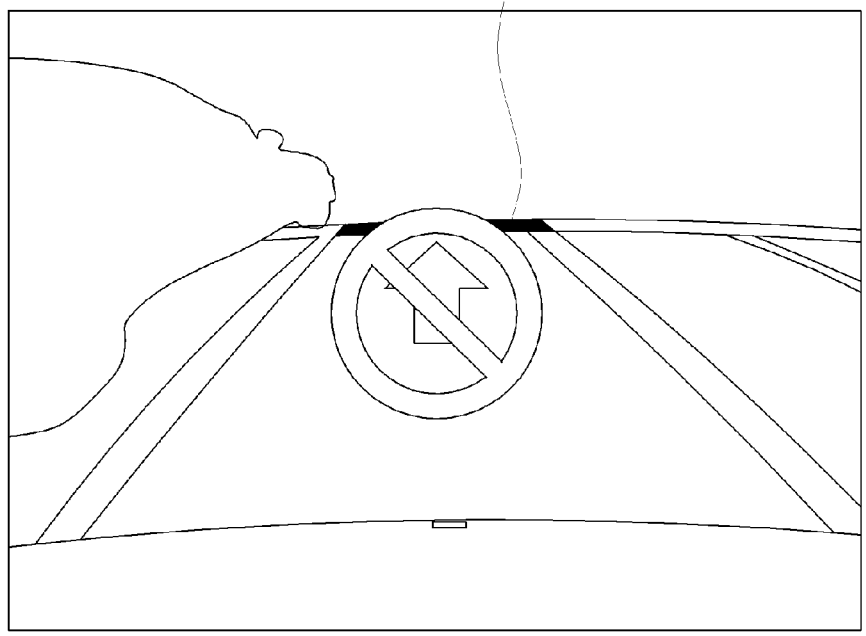

As illustrated in FIG. 6E, the vehicle stops according to the guide of the stop assist line in operation S560, and thus, parking is completed.

Next, an operation of performing parallel parking will now be described with reference to FIGS. 7A to 7E.

Figure 7A:
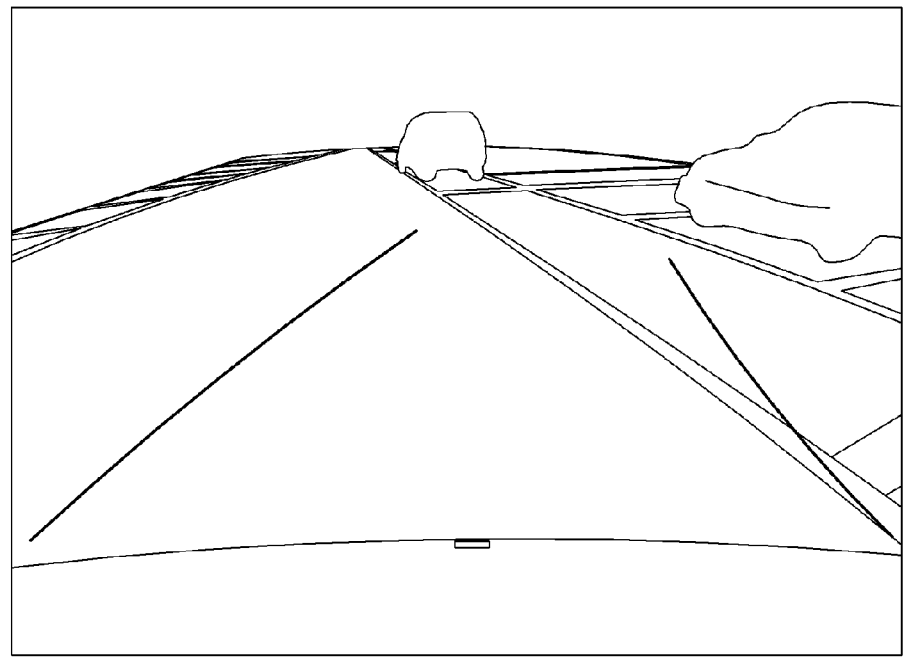
FIGS. 7A to 7E are diagrams illustrating an operation of performing parallel parking with the help of the parking guide system according to an embodiment of the present invention.
Figure 7B:
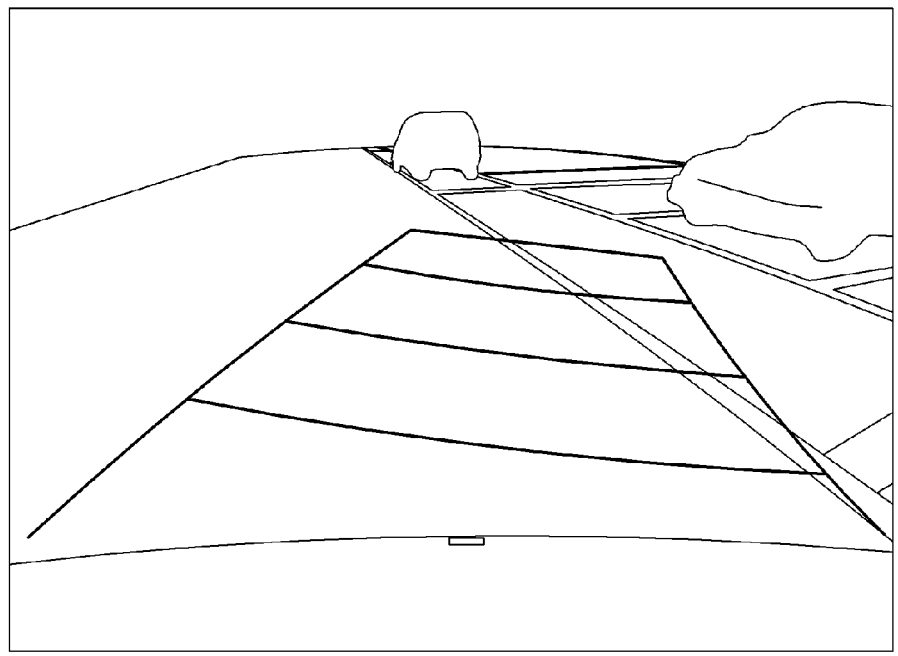
Figure 7C:
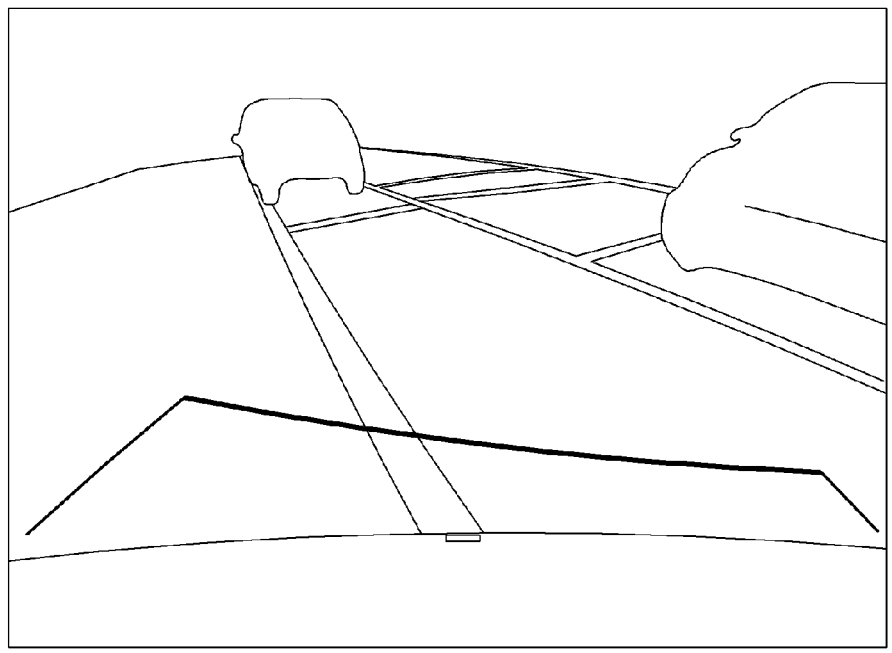

As illustrated in FIG. 7A, the parking mode is performed, and when the steering of the handle is started in operation S510, the rearward screen of the vehicle is displayed on the display unit, and as illustrated in FIG. 7B, the distance guide mark line is generated in operation S520, and the backing of the vehicle is started in operation S530. Subsequently, as illustrated in FIG. 7C, the parking movement distance is guided with the length of the distance guide mark line in operation S540.

Figure 7D:
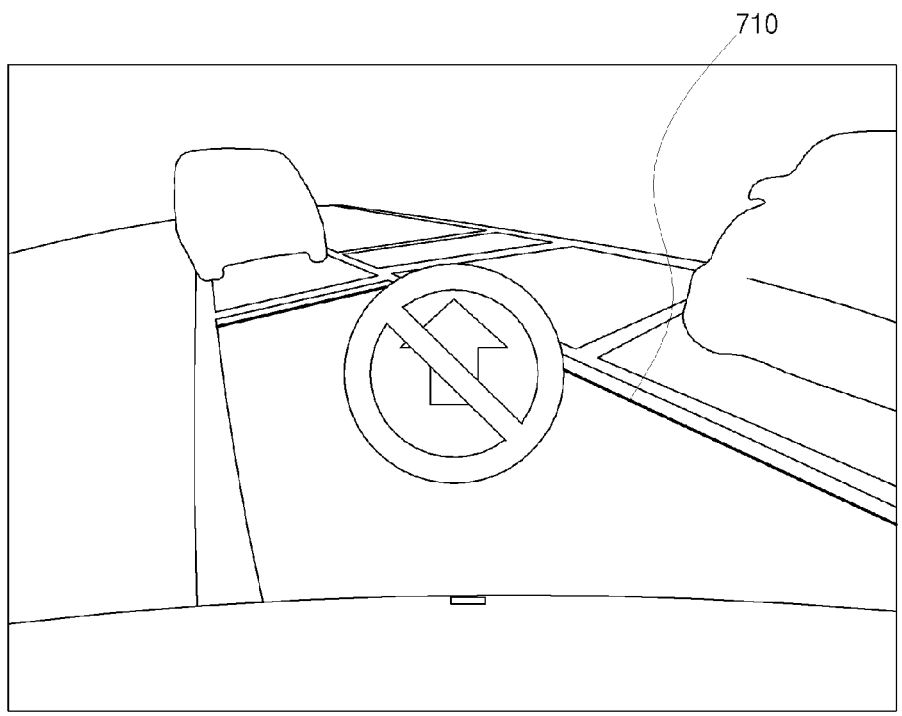

As illustrated in FIG. 7D, both the distance guide mark line and the stop assist line 610 requiring the stop of the vehicle are displayed on a screen in operation S550. At this point, similarly to perpendicular parking, a mark for guiding the stop of a vehicle is displayed on a screen depending on the case.

Figure 7E:
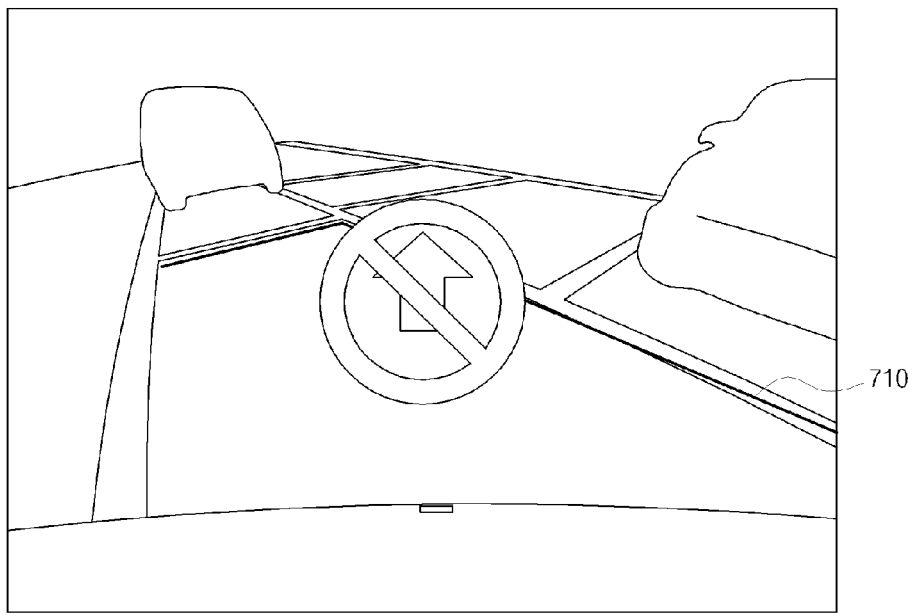

As illustrated in FIG. 7E, the vehicle stops according to the guide of the stop assist line in operation S560, and thus, parking is completed.

In an embodiment of the present invention, the steering guide of a handle may be performed with one line displayed with respect to a left bumper surface in a parking area.

Figure 8:
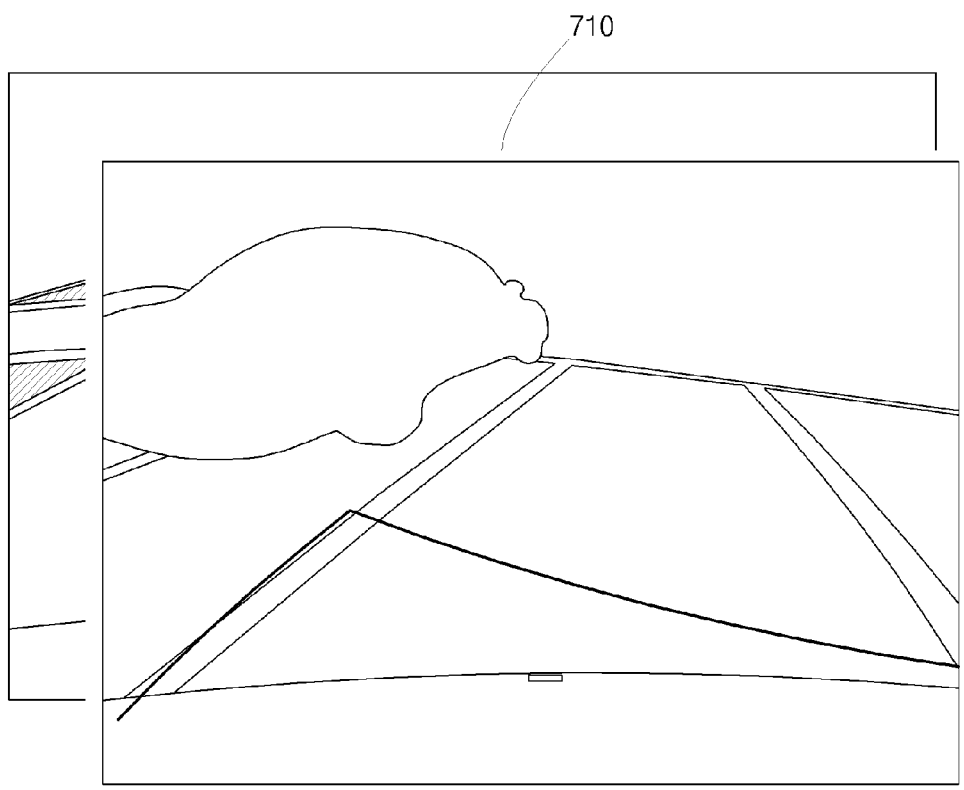
FIG. 8 is a diagram illustrating a screen for guiding the steering of a handle in the parking guide system according to an embodiment of the present invention.

FIG. 8 illustrates a screen for guiding the steering of a handle in the parking guide system according to an embodiment of the present invention.

As illustrated in FIG. 8, an expected position of a vehicle based on the steering of a handle is displayed as one line 810 with respect to an outer bumper surface in a parking area, and thus, a display screen is simplified, thereby improving visibility and enabling a driver to easily predict the position of a vehicle.

As described above, the present invention displays the minimum width and maximum width of a parking area guideline in consideration of the dimensions of a vehicle in displaying a parking area, and thus can enhance the convenience of a driver. Particularly, even when parking a vehicle in an area having an unusual landform, the present invention can more accurately and safely guide parking.

Moreover, the present invention displays a position (requiring stop) as a line in backing for parking, and thus enables a driver to immediately determine a stop position even without a stop guide phrase, thereby enhancing visibility.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A parking guide apparatus for vehicles, comprising:
   a camera mounted on a rear of a vehicle;
   a display unit disposed inside the vehicle; and
   a parking guide control unit connected to the camera and the display unit,
   the parking guide control unit comprises
   a parking logic operation unit receiving a steering angle, a speed, or a parking mode from the vehicle to perform a parking logic operation;
   a parking area guideline display unit displaying a parking area guideline for parking guide on the basis of the result of the logic operation of the parking logic operation unit; and
   an image synthesizer synthesizing the results, displayed by the parking logic operation unit and the parking area guideline display unit, and an image obtained by the camera, and the display unit displays the image synthesized by the image synthesizer,
   wherein the parking area guideline comprises a minimum width and maximum width of a parking-enabled area that are calculated by the parking area guideline display unit on the basis of dimensions of the vehicle and ambient landform information.

2. The parking guide apparatus of claim 1, wherein the parking guide control unit is comprised in the camera.

3. The parking guide apparatus of claim 1, wherein the display unit is a display unit of an Audio Video Navigation (AVN) system for vehicles, the AVN system being mounted on the vehicle.

4. The parking guide apparatus of claim 1, wherein the parking area guideline display unit further comprises stop line information that is calculated on the basis of the parking area guideline.

5. The parking guide apparatus of claim 1, wherein,
   the parking guide control unit further comprises an image amplifier amplifying the synthesized image, and
   the display unit displays the image amplified the image amplifier.

6. The parking guide apparatus of claim 1, wherein the display unit further displays steering angle mark information in which an expected position of the vehicle based on steering of a handle is displayed as one line with respect to an outer bumper surface in a parking area.

7. A rear camera apparatus for vehicles with a parking guide function, the rear camera system comprising:
   a capturer capturing a rearward image of a vehicle;
   a parking logic operation unit receiving a steering angle, a speed, or a parking mode from the vehicle to perform a parking logic operation;
   a parking area guideline display unit displaying a parking area guideline for parking guide on the basis of the result of the logic operation of the parking logic operation unit; and
   an image synthesizer synthesizing the results, displayed by the parking logic operation unit and the parking area guideline display unit, and the image captured by the capturer,
   wherein the parking area guideline comprises a minimum width and maximum width of a parking-enabled area that are calculated by the parking area guideline display unit on the basis of dimensions of the vehicle and ambient landform information.

8. The rear apparatus system of claim 7, wherein the image synthesized by the image synthesizer is transferred to a display unit of an Audio Video Navigation (AVN) system mounted on the vehicle, and displayed for a driver.

9. The rear camera apparatus of claim 7, further comprising an image amplifier amplifying the synthesized image.

10. The rear apparatus system of claim 9, wherein the image amplified by the image amplifier is transferred to a display unit of an Audio Video Navigation (AVN) system mounted on the vehicle, and displayed for a driver.

11. The rear camera apparatus of claim 7, wherein the parking area guideline display unit further comprises stop line information that is calculated on the basis of the parking area guideline.

12. The rear camera apparatus of claim 7, wherein the parking area guideline display unit further displays steering angle mark information in which an expected position of the vehicle based on steering of a handle is displayed as one line with respect to an outer bumper surface in a parking area.

13. A parking guide control unit comprising:
- a parking logic operation unit configured to receive a selection of a steering angle, speed, or mode to perform a parking logic operation;
- a parking area guideline display unit configured to display a parking area guideline based on a result of the logic operation of the parking logic operation unit; and
- an image synthesizer configured to synthesize results displayed by the parking logic operation unit and the parking area guideline display unit and an image obtained by a camera,
- wherein the parking area guideline comprises a minimum width and maximum width of a parking-enabled area that are calculated by the parking area guideline display unit on the basis of dimensions of the vehicle and ambient landform information.

14. The parking guide control unit of claim 13, further comprising an image amplifier that amplifies a synthesized image.

* * * * *